(12) United States Patent
Pelletier et al.

(10) Patent No.: US 7,990,398 B2
(45) Date of Patent: Aug. 2, 2011

(54) MATCHING MOVEMENT BEHAVIOR IN MOTION GRAPHICS

(75) Inventors: Jean-Francois Pelletier, Los Angeles, CA (US); Gregory Niles, Culver City, CA (US); Stephen Sheeler, Santa Monica, CA (US); William Stein, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 1084 days.

(21) Appl. No.: 11/735,342

(22) Filed: Apr. 13, 2007

(65) Prior Publication Data

US 2008/0256158 A1 Oct. 16, 2008

(51) Int. Cl.
*G09G 5/00* (2006.01)
*G06T 13/00* (2011.01)

(52) U.S. Cl. ........ 345/648; 345/645; 345/649; 345/660; 345/473

(58) Field of Classification Search .................. 345/645, 345/648, 473, 644, 660, 649; 700/262; 382/293
See application file for complete search history.

(56) References Cited

U.S. PATENT DOCUMENTS

| | | | | |
|---|---|---|---|---|
| 5,043,929 A | * | 8/1991 | Kramer et al. | 703/1 |
| 5,581,665 A | * | 12/1996 | Sugiura et al. | 700/251 |
| 5,619,628 A | * | 4/1997 | Fujita et al. | 345/427 |
| 5,867,631 A | * | 2/1999 | Sato et al. | 700/262 |
| 6,191,798 B1 | * | 2/2001 | Handelman et al. | 345/473 |
| 6,320,988 B1 | * | 11/2001 | Yamaguchi et al. | 382/276 |
| 2003/0018455 A1 | * | 1/2003 | Rosenthal | 703/2 |

* cited by examiner

*Primary Examiner* — Ryan R Yang
(74) *Attorney, Agent, or Firm* — Fish & Richardson P.C.

(57) ABSTRACT

Computer-implemented methods and media bearing instructions for matching movements of objects are described. In one example, the method can include determining a position of a first point in a first coordinate system, converting the position of the first point from the first coordinate system to a second coordinate system, performing a transformation on a second point in the second coordinate system, wherein the second point is initialized to a starting position in the second coordinate system, determining an ending position of the second point in the second coordinate system based on the transformation, converting the ending position of the second point in the second coordinate system to the first coordinate system, and associating the ending position of the second point in the first coordinate system to the first point in the first coordinate system, wherein the associating causes a transformation of the first point to match the transformation performed on the second point.

22 Claims, 3 Drawing Sheets

FIG. 4

MATCHING MOVEMENT BEHAVIOR IN MOTION GRAPHICS

TECHNICAL FIELD

The following description relates to editing objects in a motion graphics environment, for example, matching the movement behavior of two or more graphical objects.

BACKGROUND

Motion graphics can be used to animate single and multi-dimensional objects in multimedia applications. Motion graphics can use video and animation technology to create, manipulate and transformation graphical objects. Software applications that can enable motion graphics include Motion offered by Apple Inc. (Cupertino, Calif.), After Effects offered by Adobe Systems Inc. (San Jose, Calif.), Maya offered by Autodesk Inc. (San Rafael, Calif.), and the like.

SUMMARY

In one example, in a motion graphics environment, a user can pin (e.g., associate) a first object to a second object. Once pinned, a transformation of the second object is matched by the first object. The transformation can include one or more of a translational motion, a rotational motion, a multi-dimensional translation, a scaling, or a combination thereof.

In one aspect, a computer-implemented method is described. The method includes determining a position of a first point in a first coordinate system, converting the position of the first point from the first coordinate system to a second coordinate system, performing a transformation on a second point in the second coordinate system, wherein the second point is initialized to a starting position in the second coordinate system, determining an ending position of the second point in the second coordinate system based on the transformation, converting the ending position of the second point in the second coordinate system to the first coordinate system, and associating the ending position of the second point in the first coordinate system to the first point in the first coordinate system, wherein in the associating causes a transformation of the first point to match the transformation performed on the second point.

This, and other aspects, can include one or more of the following features. The first point can correspond to a first object. The second point can correspond to a second object. The transformation can be one or a combination of a rotation, a translation, and a scaling. The translation can occur along a trajectory.

In another aspect, a computer-implemented method is described. The method includes pinning a first graphical object to a second graphical object, receiving a request that a predetermined transformation be performed on the second graphical object, and in response to the received request, performing the predetermined transformation on the second graphical object, wherein the pinning causes the predetermined transformation to be performed on the first graphical object, and wherein the transformation is performed by matching a position of a second point on the second graphical object subsequent to the predetermined transformation to a first point on the first graphical object.

This, and other aspects, can include one or more of the following features. The method can include associating the first point with the second point based on user input, prior to receiving the request to perform the predetermined transformation. The method can include pinning the first graphical object to the second graphical object based on a spatial relationship selected by the user. The predetermined transformation can be one or more of scaling, translating, rotating, and a combination thereof. The first graphical object can be associated with a first coordinate system and the second graphical object can be associated with a second coordinate system. Matching the position of the second point to the first point can include receiving the first point in the first coordinate system, determining the position of the first point in the second coordinate system, prior to performing the predetermined transformation, determining the position of the second point in the second coordinate system subsequent to performing the predetermined transformation, converting the position of the second point in the second coordinate system subsequent to performing the predetermined transformation to the first coordinate system, and assigning the first point to the converted position of the second point. The position of the first point in the second coordinate system prior to performing the predetermined transformation can be based on a transformation matrix relating the first coordinate system and the second coordinate system. Converting the position of the second point in the second coordinate system subsequent to performing the predetermined transformation to the first coordinate system can be based on a transformation matrix relating the second coordinate system and the first coordinate system.

In another aspect, a medium bearing instructions to enable one or more machines to perform operations is described. The operations include determining a position of a first point in a first coordinate system, converting the position of the first point from the first coordinate system to a second coordinate system, performing a transformation on a second point in the second coordinate system, wherein the second point is initialized to a starting position in the second coordinate system, determining an ending position of the second point in the second coordinate system based on the transformation, converting the ending position of the second point in the second coordinate system to the first coordinate system, and associating the ending position of the second point in the first coordinate system to the first point in the first coordinate system, wherein the associating causes a transformation of the first point to match the transformation performed on the second point.

This, and other aspects, can include one or more of the following features. The first point can correspond to a first object. The second point can correspond to a second object. The transformation can be one or a combination of a rotation a translation and a scaling. The translation can occur along a trajectory.

In another aspect, a medium bearing instructions to enable one or more machines to perform operations is described. The operations include pinning a first graphical object to a second graphical object, receiving a request that a predetermined transformation be performed on the second graphical object, and in response to the received request, performing the predetermined transformation on the second graphical object, wherein the pinning causes the predetermined transformation to be performed on the first graphical object, and wherein the transformation is performed by matching a position of the second point on the second graphical object subsequent to the predetermined transformation to a first point on the first graphical object This and other aspects can include one or more of the following features. The operations can include associating the first point with the second point based on user input, prior to receiving the request to perform the predetermined transformation. The operations can further include pinning the first graphical object to the second graphical object based on a spatial relationship selected by the user. The predetermined transformation can be one or more of scaling, translating, rotating, and a combination thereof. The first graphical object can be associated with a first coordinate system and the second graphical object can be associated with a second coordinate system. Matching the position of the second point to the first point can include receiving the first point in the first coordinate system, determining the position of the first point in the second coordinate system prior to performing the predetermined transformation, determining the position of the second point in the second coordinate system subsequent to performing the predetermined transformation, converting the position of the second point in the second coordinate system subsequent to performing the predetermined transformation to the first coordinate system, and assigning the first point to the converted position of the second point. The position of the first point in the second coordinate system prior to performing the predetermined transformation can be based on a transformation matrix relating the first coordinate system and the second coordinate system. Converting the position of the second point in the second coordinate system subsequent to performing the predetermined transformation to the first coordinate system can be based on a transformation matrix relating to second coordinate system and the first coordinates system.

The systems and techniques described here can present one or more of the following advantages. An object displayed in a foreground can be pinned to an object displayed in the background to match the movement of the foreground and background objects. Further, pinning objects can enable simultaneously modifying the properties of the two objects, the properties including blur, color correction, and the like. In addition, transformation data applied to a first object, e.g., animation, can be applied to a second object without analyzing the first object. Furthermore, animations and other effects applied to a first object can simultaneously be applied to a second (or third, fourth, etc.) pinned object.

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
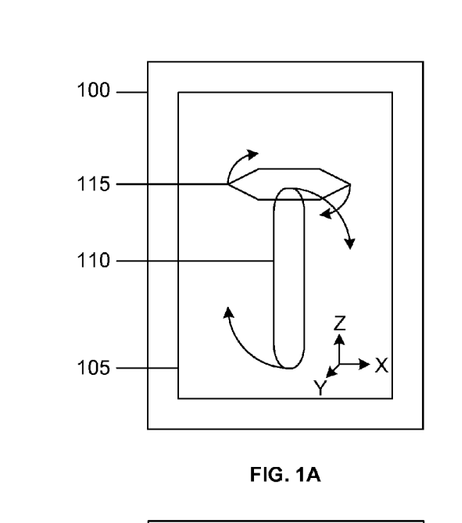
FIG. 1A is a schematic of an example of a user interface displaying motion of independent objects.

FIG. 1A depicts a schematic of a display device 100 displaying a user interface 105 including a source object 110 and a destination object 115. The display device 100 can include one of a cathode ray tube (CRT), a liquid crystal display (LCD) monitor, and the like. Alternatively, the display device 100 can be any suitable display device, e.g., a projection screen. The display device 100 can be operatively coupled to a system on which a motion graphics editing application is installed. The system can include one of a personal computer, a laptop computer, a personal digital assistant (PDA), a smart phone, a workstation, and the like. A pointing device can be coupled to the display device 100 and the system. A user can use a key board and virtually any suitable pointing device (e.g., mouse, track ball, stylus, touch screen, and the like) to interact with the motion graphics editing application. The system, the display device 100, the key board, and the pointing device can be operatively coupled through wired and wireless means.

In some implementations, the source object 110 and the destination object 115 can be created using drawing tools available in the motion graphics editing application. In other implementations, the objects 110 and 115 can be created in an external drawing application and imported into the motion graphics editing application. In some implementations, the objects 110 and 115 can be created in a drawing application on a separate system and transferred to the system on which the motion graphics editing application is installed. The objects can be transferred using storage devices or over a network, e.g., as an e-mail attachment. In one example, the objects 110 and 115 can be downloaded from the internet.

In some implementations, the source object 110 and the destination object 115 can be two-dimensional (2D) closed surfaces. Alternatively, the objects 110 and 115 can be one-dimensional line (1D) drawings, three-dimensional (3D) objects, or any combination of 1D, 2D, and 3D drawings. The objects 110 and 115 can be of any shape including regular geometric shapes or irregular shapes.

The graphics space, in the absence of any objects, can be associated with a world coordinate system. The source object 110 can be associated with a source coordinate system. The destination object 115 can be associated with a destination coordinate system. In this manner, each object positioned in the graphics space can be associated with a corresponding coordinate system. For example, when the source object 110 is positioned at a location in the graphics space, a reference point of the source object 110 can be positioned at the origin in the source coordinate system. The reference point of the source object 110 may or may not be positioned at the origin of the world coordinate system or the destination coordinate system. When the reference point of the source object 110 is positioned at a point in the graphics space, a transformation matrix relating the coordinates of the reference point in the source coordinate system to coordinates in the world coordinate system can be generated. Similarly, a transformation matrix relating the coordinates of the reference point in the source coordinate system to coordinates in the destination coordinate system can be generated.

In some implementations, independent transformations can be performed on the source object 110 and the destination object 115. For example, the source object 110 can be positioned at a first position on the user interface 105. A transformation can be imparted to the source object 110. The transformation can be one or a combination of a rotation, a translation, a scaling, and the like. For example, a rotational motion can be imparted to the source object 110. The rotational motion can be a clockwise rotation about the center of the source object 110. Subsequently, a destination object 110 can be positioned at a second position on the user interface 105. When the reference point of the destination object 115 is positioned at a point in the world space, a transformation matrix relating the coordinates of the reference point of the destination object 115 in the destination coordinate system to coordinates in the world coordinate system can be generated.

A rotational motion can be imparted to the destination object 115. In some implementations, the motion graphics editing application can include pre-determined rotational motions. The user can upload one of the pre-determined rotational motions for imparting to objects 110 and 115. In addition, the user can choose a point about which the objects 110 and 115 rotate. The point about which each object rotates can lie on the object or at any point away from the object.

In the example shown, the source object 110 and the destination object 115 are 2D objects positioned on the XZ plane. Alternatively, the objects 110 and 115 can positioned on any plane, e.g., XY, YZ planes. In some implementations, the axis of rotation can be perpendicular to the plane of the objects. In other implementations, the axis of rotation can be parallel to the plane of the objects. In other implementations, the axis of rotation can point in any direction. Accordingly, the source object 110 and the destination object 115 can be configured to rotate about the same 2D plane, a different 2D plane, or in 3D.

Figure 1B:
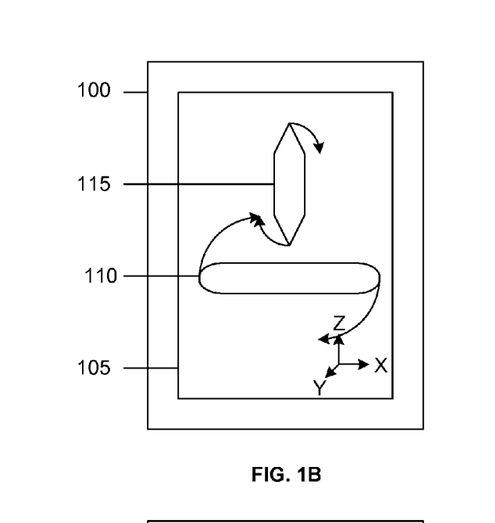
FIG. 1B is a schematic of an example of a user interface displaying motion of independent objects.

In the example shown, the axis of rotation of the source object 110 can pass through the center of the source object 110. Similarly, the axis of rotation of the destination object 115 can pass through the center of the destination object 115. FIG. 1B depicts a schematic of an example of a display device 100 displaying a snapshot of the user interface 100 wherein the source object 110 and the destination object 115 are in motion. In the example shown, the motion associated with the source object 110 and the destination object 115 is rotational. When the associated rotational motion is imparted to the objects 110 and 115, the source object 110 can rotate about the axis of rotation corresponding to the source object 110 while the destination object 115 can rotate about the axis of rotation corresponding to the destination object 115. The two objects 110 and 115 need not move in unison.

Figure 2A:
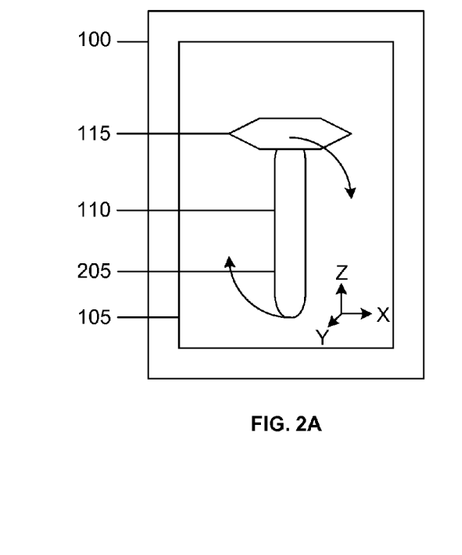
FIG. 2A is a schematic of an example of a user interface displaying motion of pinned objects.

FIG. 2A depicts a schematic of an example of a display device 100 wherein the destination object 115 is pinned to the source object 110. Pinning can be a one step process wherein a point on the destination object 115 can be attached to a point on the source object 110. In some implementations, the source object 110 can be positioned at any point in the graphics space. The destination object 115 can be positioned at any point on the source object 110. In some implementations, a user can drag the destination object 115 and place the destination object 110 at any location in the user interface 105. The destination object 115 can be placed over the source object 110. Alternatively, the destination object 115 can be placed away from the source object 110. Pinning the destination object 115 to the source object 110 can create a grouped object 205. Subsequent to pinning, a rotational motion can be imparted to the source object 110. Since the destination object 115 is pinned to the source object 110, the movement of the destination object 115 can match the movement of the source object 110.

Figure 2B:
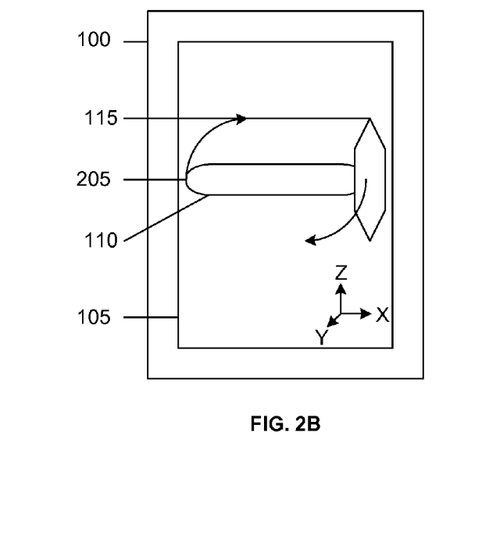
FIG. 2B is a schematic of an example of a user interface displaying motion of pinned objects.

FIG. 2B depicts a schematic of an example of a display device 100 wherein the source object 110 is associated with a rotational motion, and the movement of the destination object 115 matches that of the source object 110 since a destination point associated with the destination object 115 is pinned to a source point associated with the source object 110. The movement of the destination object 115 can be configured to match that of the source object 110 by identifying the coordinates of destination point on the destination object 115 in the destination coordinate system prior to the motion. Subsequently, the coordinates of the destination point can be transformed from the destination coordinate system to the source coordinate system. Due to the rotational motion, the coordinates of the source point in the source coordinate system change after a time interval. The position of the source point at a time after the rotational motion has been imparted can be identified. Subsequently, the coordinates of the source point can be transformed from the source coordinate system to the destination coordinate system. The destination object 115 can be positioned at the determined coordinates of the source point in the destination coordinate system. The trajectory of the source object 110 can be determined based on the positions of the source object 110 at the identified time instants.

In some implementations, a vector defining the initial position of the source point on the source object 110 at time, t=0, can be represented by P(t=0). A vector defining the position of the reference point on the source object 110 at time, t=t, can be represented by P(t=t). In addition, a transformation matrix from the destination coordinate system to the world coordinate system (associated with the graphics space) at time, t=0, can be represented by DestToWorld0. A transformation matrix from the world coordinate system to the source coordinate system, at time, t=0, can be represented by WorldToSrc0. A transformation matrix from the source coordinate system to the world coordinate system, at time, t=t, can be represented by SrcToWorldt. A transformation matrix from the world coordinate system to the destination coordinate system, at time, t=t, can be represented by WorldToDestt. The position of the reference point at time, t=t, P(t=t), can be determined using equation (1).

$$P(t=t)=[\text{WorldToDest}t] \times [\text{SrcToWorld}t] \times [\text{WorldToSrc0}] \times [\text{DestToWorld0}] \times P(t=0) \quad (1)$$

Figure 3:
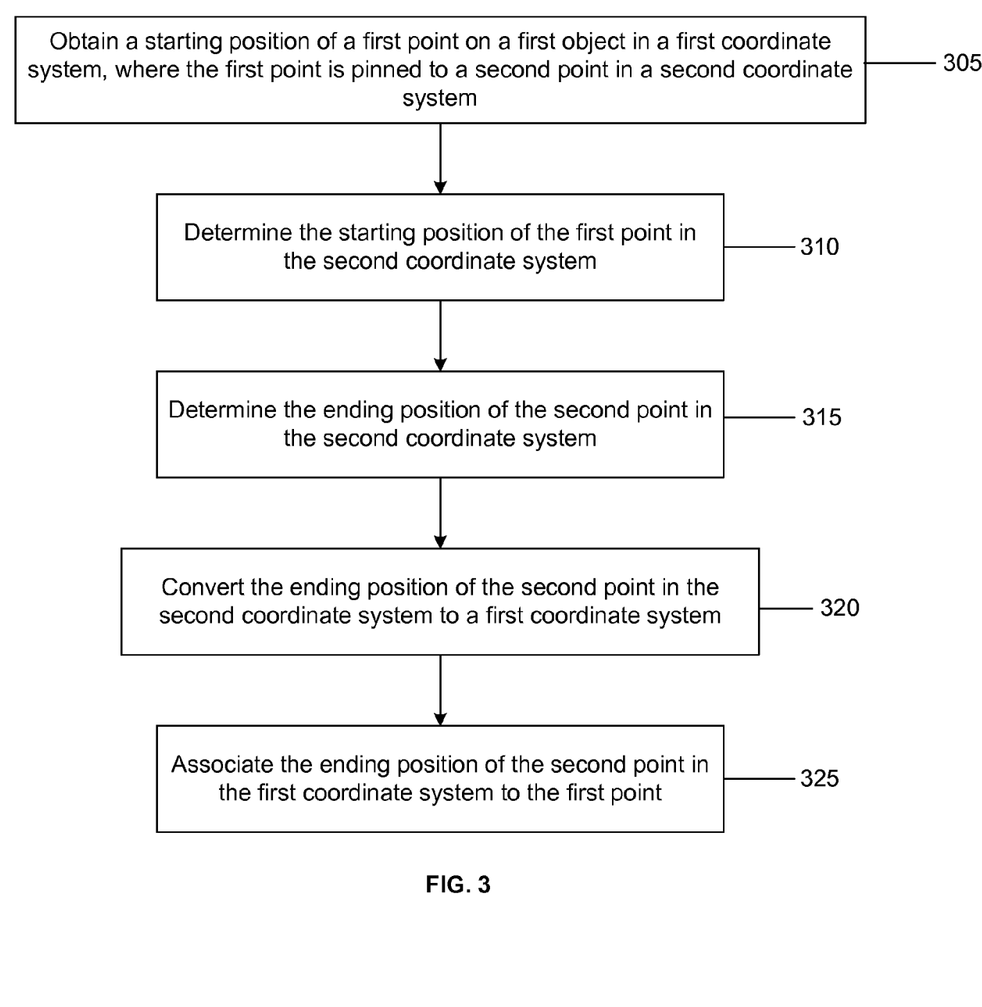
FIG. 3 is a flow chart of an example of a process for matching the movement of two objects.

FIG. 3 is a flow chart of an example of a process for matching the movement of two objects. In some implementations, each object can have a corresponding reference point. The coordinates of the reference point can represent the coordinates of a position of the corresponding object. The coordinates of all points on the object can be relative to that of the object's reference point. For example, when the object is positioned at a first position, the coordinates of the reference point of the object can match those of the first position. When the object is moved to a second position, the coordinates of the reference point can be changed to that of the second position.

In some implementations, the position of a first point in a first coordinate system can be obtained at 305. The first point can be the reference point. Alternatively, the first point can be any point. In some implementations, the first point can correspond to a first object. The first point can be located on the first object. Alternatively, the first point can be located away from the first object. The first point can be pinned to a second point. The second point can be associated with a second object. The second point can have a corresponding second coordinate system.

In some implementations, a transformation can be imparted to the second point. The transformation can be a rotation, a translation, a motion along a three dimensional trajectory, or a combination thereof. For example, the transformation can be a rotational motion. When a motion is imparted to the second point, the position of the second point in the second coordinate system can be initialized to a starting position. The starting position can correspond to a position at time, t=0. In implementations where the second point corresponds to a second object, imparting motion to the second point can cause the second object to move in the direction of the imparted motion. The direction of motion can be pre-defined. When a motion is imparted to the second object, a movement of the second point from the starting position to an ending position within a time interval, t, can be determined.

In some implementations, prior to imparting motion, the position of the first point in the second coordinate system can be determined at 310. The coordinates of the first point in the second coordinate system can be determined based on a transformation matrices relating the first coordinate system to the world coordinate system, and the world coordinate system and the second coordinate system. Using the transformation matrices, the position of the first point on the first object in the second coordinate system at time, t=0, can be determined.

In some implementations, the ending position of the second point in the second coordinate system at time, t=t, can be determined at 315. The change in position can be represented by a position vector. The position vector can be pre-defined based on the imparted motion. Alternatively, the position vector can be calculated based on the motion. Determining the movement of the second point from the starting position to the ending position can include determining the position vector.

In some implementations, the ending position of the second point in the second coordinate system, determined at time, t=t, can be converted to the first coordinate system at 320. A transformation matrix relating the second coordinate system to the world coordinate system can be determined. Another transformation matrix relating the world coordinate system to the first coordinate system can be determined. Converting the ending position of the second point in the second coordinate system to the first coordinate system can be performed using the determined transformation matrices.

Subsequently, a product of the transformation matrices and the starting position of the first point, can be calculated based on Equation (1) to determine the ending position of the first point in the first coordinate system. Subsequent transformation of the coordinates of the second point from the second coordinate system to the first coordinate system and associating the coordinates in the first coordinate system to the first point can cause the movement of the first point to match that of the second point.

In some implementations, the first point in the first coordinate system can be associated with the ending position of the second point in the second coordinate system at 325. For example, in the user interface 105, the user can pin the first point to the starting position of the second point. Subsequently, when the imparted motion causes a change in the coordinates of the second point from the starting position to the ending position, associating the coordinates of the ending position of the second point to the first point can enable matching movement of the two points. Subsequently, a new series of steps to determine the next position of the second point and matching the positions of the first and second points can be commenced and the process can be repeated. The ending position of a first series can be the starting position of a new series.

Figure 4:
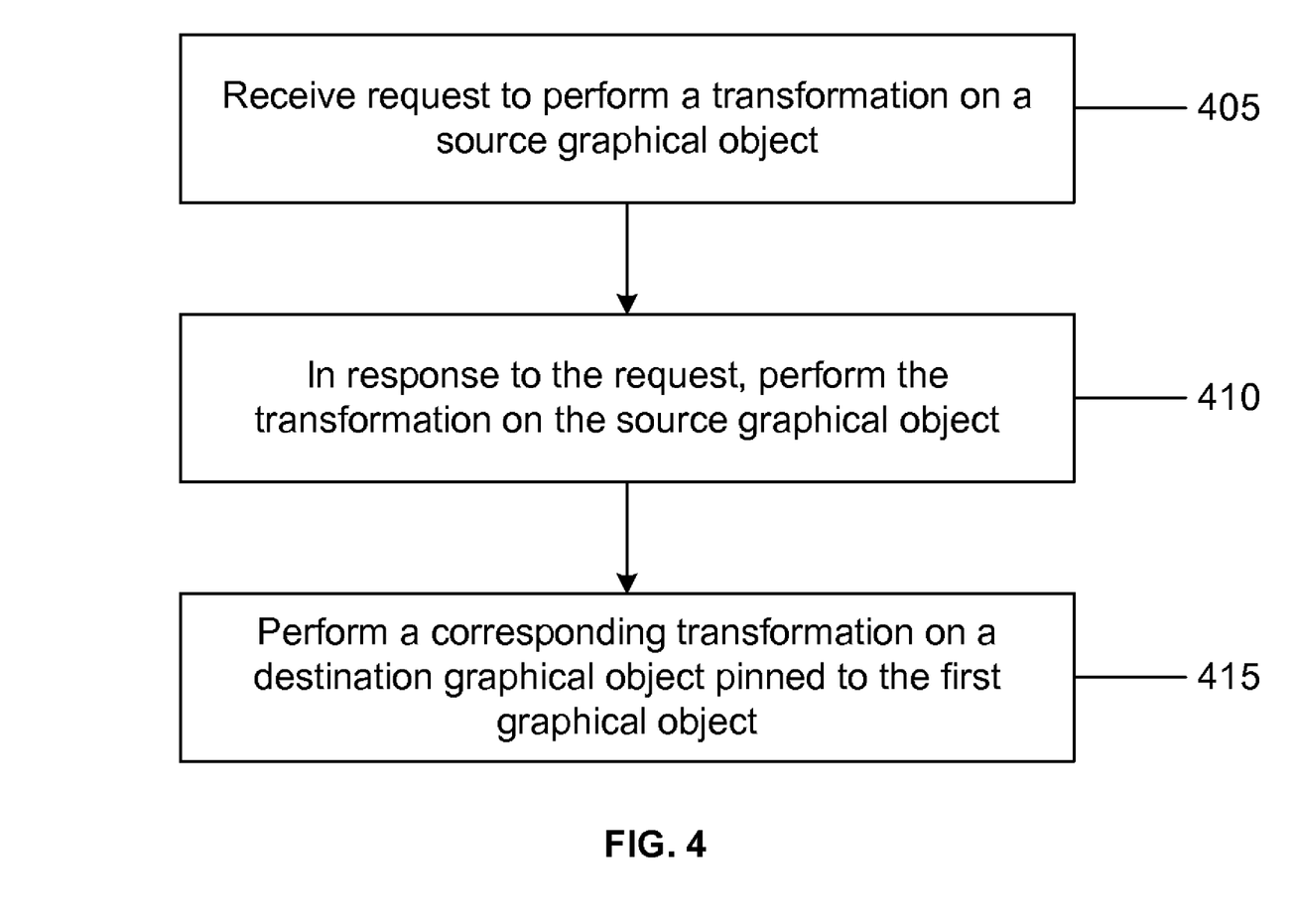
FIG. 4 is a flow chart of an example of a process for performing transformations on graphical objects.

FIG. 4 is a flow chart of an example of a process for performing transformations on graphical objects in response to a request. In some implementations, a first graphical object, e.g., a source graphical object, and a second graphical object, e.g., a destination graphical object, can be drawn on a user interface. The graphical objects can be a 1D line drawings, a 2D surfaces, a 3D objects, a photograph, any picture, or any combination thereof. A user can draw the source graphical object using drawing tools. Alternatively, the user can upload the source graphical object into the motion graphics editing environment. In some implementations, a request to perform a transformation on the source graphical object can be received at 405. The request can be received from a user. The user can select a predetermined transformation and request that the predetermined transformation to be applied to the source graphical object. Alternatively, the user can create a transformation and apply the created transformation to the source graphical object. In other implementations, the transformation can be automatically applied to the source graphical object. For example, the user may have created, applied a transformation to, and stored the source graphical object using a different editing application. When stored, the source graphical object can include instructions to transform the object when uploaded. Uploading the stored source graphical object into the motion graphics editing environment can cause the stored instructions to be transmitted as a request to the motion graphics editing application.

In response to receiving the request, the transformation can be performed on the source graphical object at 410. In some implementations, the transformation can be a rotation. The request can be to rotate the source graphical object about an axis. Alternatively, the transformation can be a translation, a scaling, a 3D motion, or combinations thereof. The source graphical object can be transformed according to the predetermined transformation. In some implementations, a corresponding transformation can be performed on a destination graphical object pinned to the source graphical object at 415. The destination graphical object can be pinned to the source graphical object by associating a point on the destination graphical object to a point on the source graphical object. The source and destination objects can be associated with a source and destination coordinate system, respectively. In some implementations, the coordinates of the pinned point on the destination graphical object in the destination coordinate system can match that of the pinning point on the source graphical object in the source coordinate system. The pinning point can be the point on the source graphical object to which the destination graphical object is pinned. In such implementations, when displayed on the user interface, the source and destination graphical objects can appear to be in contact with each other. In other implementations, the destination graphical object can be pinned relative to the source graphical object. In such implementations, the two graphical objects may not appear in contact with each other. However, the transformations performed on the source graphical object can also be performed on the destination graphical object.

In some implementations, each object can be displayed in the user interface 105 on the display device 100. Each reference point on each object can also be displayed on the display device 100. The motion of each object, either independently or subsequent to pinning can also be displayed on the display device. The coordinates of each object in the world coordinate system, the source coordinate system, and the destination coordinate system can depend on the shape, orientation, and a number of dimensions of the object. A coordinate of each point on each object can be stored on a storage device. In addition, transformation matrices to transform coordinates from one coordinate system to another coordinate system can also be stored on a storage device. The new coordinates on each object due to a motion imparted to the object can also be stored on the storage device. The storage devices can include computer readable media including semiconductor memory devices, e.g., EPROM, EEPROM, and flash memory devices, magnetic disks, e.g., internal hard disks or removable disks, magneto optical disks, and CD ROM and DVD-ROM disks.

A number of implementations of the invention have been described. Nevertheless, it will be understood that various modifications may be made without departing from the spirit and scope of the disclosure. For example, the motion can include a translational motion. The source object can be configured to move in a straight line in any direction. Pinning the destination object to the source object can cause both objects to exhibit translational motion. In some implementations, the type of motion can be determined by the system, e.g., a rotational motion about a center of the object. In other implementations, the motion can be three dimensional. A user can draw a trajectory of motion. The trajectory can include a path drawn from any point on the source object in any direction that the user chooses. When the user imparts motion to the source object, the source object can follow the trajectory drawn by the user.

In other implementations, the motion can be a combination of rotation and translation. For example, the destination object can be pinned to the source object. A rotational motion can be imparted to the source object. Pinning the destination object to the source object can cause the rotational motion of the destination object to match the motion of the point where the destination object is pinned to the first object. Subsequently, the user can select a point on the first object and draw a translational trajectory. The trajectory can lie in any direction and can be a combination of directions. In addition to matching the rotational motion of the source object, the destination object can also match the translational motion defined by the trajectory.

In some implementations, scaling of the destination object can be matched to that of the source object. For example, a reference point of the destination object can be pinned to a reference point of the source object. Subsequently, the dimensions of source object can be increased by a factor of two. Pinning the destination object to the source object can cause the dimensions of the destination object to also increase by the same factor.

In some implementations, pinning a destination object to a source object can cause the reference points on the two objects to be assigned the same coordinates. In such implementations, the two objects can appear to be in physical contact with each other in the user interface. In other implementations, pinning the destination object to the source object can cause the reference point of the destination object to be fixed with respect to the reference point of the source object. Thus, the two objects may not appear to be in physical contact with each other. Despite the absence of appearance of physical contact, imparting motion to the source object can cause the destination object to match the imparted motion.

In some implementations, the movement of any object can be matched to that of any other object. The movements of more than one object can also be matched. Each object can have a corresponding coordinate system. Matching movements of objects can be performed by determining transformation matrices converting one object's coordinate system into another object's coordinate system and additionally determining converting object coordinate systems to world coordinate systems, and vice versa. In some implementations, more than one point on a first object can be pinned to corresponding number of points on a second object to match movement. Accordingly, other embodiments are within the scope of the following claims.

What is claimed is:

1. A computer-implemented method comprising:
    determining a position of a first point in a first coordinate system, wherein the first point corresponds to a first object;
    converting the position of the first point from the first coordinate system to a second coordinate system;
    performing a scaling transformation on a second object about a second reference point in the second coordinate system, wherein a second point corresponding to the second object and different from the second reference point is initialized to a starting position in the second coordinate system and wherein the first object is not being pinned to the second object;
    determining an ending position of the second point in the second coordinate system based on the scaling transformation of the second object about the second reference point;
    converting the ending position of the second point in the second coordinate system to the first coordinate system; and
    relating the ending position of the second point in the first coordinate system with the first point in the first coordinate system, wherein the relating causes a scaling transformation of the first object about a first reference point that tracks the scaling transformation performed on the second object about the second reference point, the first reference point being different from the second reference point,
    wherein the determining the position of the first point and the ending position of the second point, the converting, the scaling transformations, and the relating are performed using a computer system.

2. A computer-implemented method comprising:
    associating a first graphical object with a second graphical object without pinning the associated first and second graphical objects;
    receiving a request that a rotation transformation about a second rotation axis associated with the second graphical object be performed on the second graphical object; and
    in response to the received request, performing the rotation transformation about the second rotation axis on the second graphical object, wherein the associating causes a rotation transformation about a first rotation axis associated with the first graphical object to be performed on the first graphical object, wherein the first rotation axis is different from the second rotation axis, and wherein the rotation transformation about the first rotation axis is performed by relating a position of a second point on the second graphical object subsequent to the rotation transformation about the second rotation axis to a first point on the first graphical object,
    wherein the receiving, the associating, the rotation transformation about the first rotation axis and the rotation transformation about the second rotation axis are performed using a computer system.

3. The method of claim 2 further comprising:
    prior to receiving the request to perform the rotation transformation about the second rotation axis, relating the first point with the second point based on user input.

4. The method of claim 2, wherein said relating the position of the first point on the first graphical object and the position of the second point on the second graphical object is based on a spatial relationship selected by the user.

5. The method of claim 2 wherein the first graphical object is associated with a first coordinate system and the second graphical object is associated with a second coordinate system.

6. The method of claim 5 wherein said relating the position of the second point to the first point comprises:
    receiving the first point in the first coordinate system;
    determining the position of the first point in the second coordinate system prior to performing the rotation transformation about the first rotation axis;
    determining the position of the second point in the second coordinate system subsequent to performing the rotation transformation about the second rotation axis;

converting the position of the second point in the second coordinate system subsequent to performing the rotation transformation about the second rotation axis to the first coordinate system; and assigning to the first point a position of having a specified spatial relation to the converted position of the second point.

7. The method of claim 6 wherein the position of the first point in the second coordinate system prior to performing the rotation transformation about the first rotation axis is based on a transformation matrix relating the first coordinate system and the second coordinate system.

8. The method of claim 6 wherein converting the position of the second point in the second coordinate system subsequent to performing the rotation transformation about the second rotation axis to the first coordinate system is based on a transformation matrix relating the second coordinate system and the first coordinate system.

9. A non-transitory computer readable medium bearing instructions to enable one or more machines to perform operations comprising:

determining a position of a first point in a first coordinate system, wherein the first point corresponds to a first object;

converting the position of the first point from the first coordinate system to a second coordinate system;

performing a scaling transformation on a second object about a second reference point in the second coordinate system, wherein a second point corresponding to the second object and different from the second reference point is initialized to a starting position in the second coordinate system and wherein the first object is not being pinned to the second object;

determining an ending position of the second point in the second coordinate system based on the scaling transformation of the second object about the second reference point;

converting the ending position of the second point in the second coordinate system to the first coordinate system; and relating the ending position of the second point in the first coordinate system with the first point in the first coordinate system, wherein the relating causes a scaling transformation of the first object about a first reference point that tracks the scaling transformation performed on the second object about the second reference point, the first reference point being different from the second reference point.

10. A non-transitory computer readable medium bearing instructions to enable one or more machines to perform operations comprising:

associating a first graphical object with a second graphical object without pinning the associated first and second graphical objects;

receiving a request that a rotation transformation about a second rotation axis associated with the second graphical object be performed on the second graphical object; and in response to the received request, performing the rotation transformation about the second rotation axis on the second graphical object, wherein the associating causes a rotation transformation about a first rotation axis associated with the first graphical object to be performed on the first graphical object, wherein the first rotation axis is different from the second rotation axis, and wherein the rotation transformation about the first rotation axis is performed by relating a position of a second point on the second graphical object subsequent to the rotation transformation about the second rotation axis to a first point on the first graphical object.

11. The computer readable medium of claim 10, the operations further comprising:

prior to receiving the request to perform the rotation transformation about the second rotation axis, relating the first point with the second point based on user input.

12. The computer readable medium of claim 11, wherein said relating the position of the first point on the first graphical object and the position of the second point on the second graphical object is based on a spatial relationship selected by the user.

13. The computer readable medium of claim 10 wherein the first graphical object is associated with a first coordinate system and the second graphical object is associated with a second coordinate system.

14. The computer readable medium of claim 13 wherein said relating the position of the second point to the first point comprises:

receiving the first point in the first coordinate system;

determining the position of the first point in the second coordinate system prior to performing the rotation transformation about the first rotation axis;

determining the position of the second point in the second coordinate system subsequent to performing the rotation transformation about the second rotation axis;

converting the position of the second point in the second coordinate system subsequent to performing the rotation transformation about the second rotation axis to the first coordinate system; and assigning to the first point a position of having a specified spatial relation to the converted position of the second point.

15. The computer readable medium of claim 14 wherein the position of the first point in the second coordinate system prior to performing the rotation transformation about the first rotation axis is based on a transformation matrix relating the first coordinate system and the second coordinate system.

16. The computer readable medium of claim 14 wherein converting the position of the second point in the second coordinate system subsequent to performing the rotation transformation about the second rotation axis to the first coordinate system is based on a transformation matrix relating the second coordinate system and the first coordinate system.

17. A method performed by one or more processes executing on a computer system, the method comprising:

associating at least two graphical objects based on user input, said associating without pinning the associated graphical objects;

receiving user input identifying one spatial operation other than translation to be performed on the associated graphical objects about respective spatial references corresponding to the associated graphical objects, wherein the respective spatial references corresponding to the associated graphical objects are different from each other; and performing the identified spatial operation other than translation substantially simultaneously on each of the associated graphical objects to cause the associated graphical objects to respond as if each associated graphical object were being operated on independently of other associated objects, wherein the associating, the receiving and the identified spatial operation are performed by a computer system.

18. The method of claim 17 wherein the spatial operation other than translation comprises rotation, and wherein the respective spatial references corresponding to the associated graphical objects represent respective axes of rotation corresponding to the associated graphical objects.

19. The method of claim 18, wherein the respective axes of rotation corresponding to the associated graphical objects have fixed absolute spatial locations and absolute orientations with respect to a world coordinate system.

20. The method of claim 18, wherein said performing the identified spatial operation comprises:
   rotating each associated graphical object about its respective axis of rotation to preserve a relative orientation between the associated graphical objects.

21. The method of claim 17 wherein the spatial operation other than translation comprises scaling, and wherein the respective spatial references corresponding to the associated graphical objects represent respective center points of the associated graphical objects.

22. The method of claim 21 wherein said performing the identified spatial operation comprises:
   scaling each associated graphical object about its respective center point to preserve a relative spacing between the center points of the associated graphical objects.

* * * * *